Oct. 25, 1938.  A. W. FRENCH  2,134,361
METHOD OF PRODUCING PLASTIC CONCRETE
Filed Oct. 7, 1935
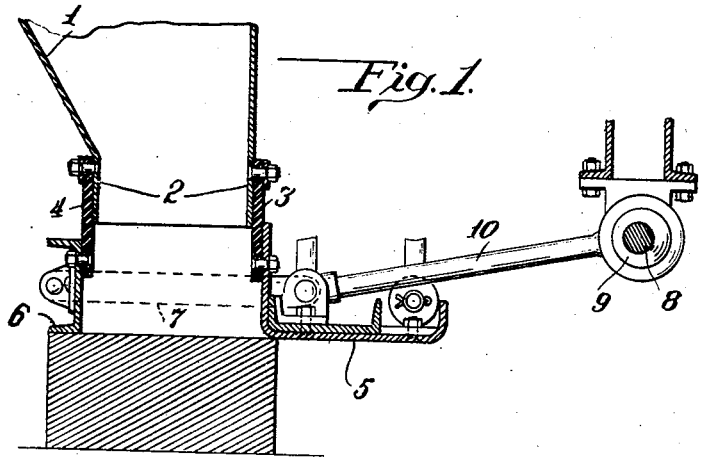
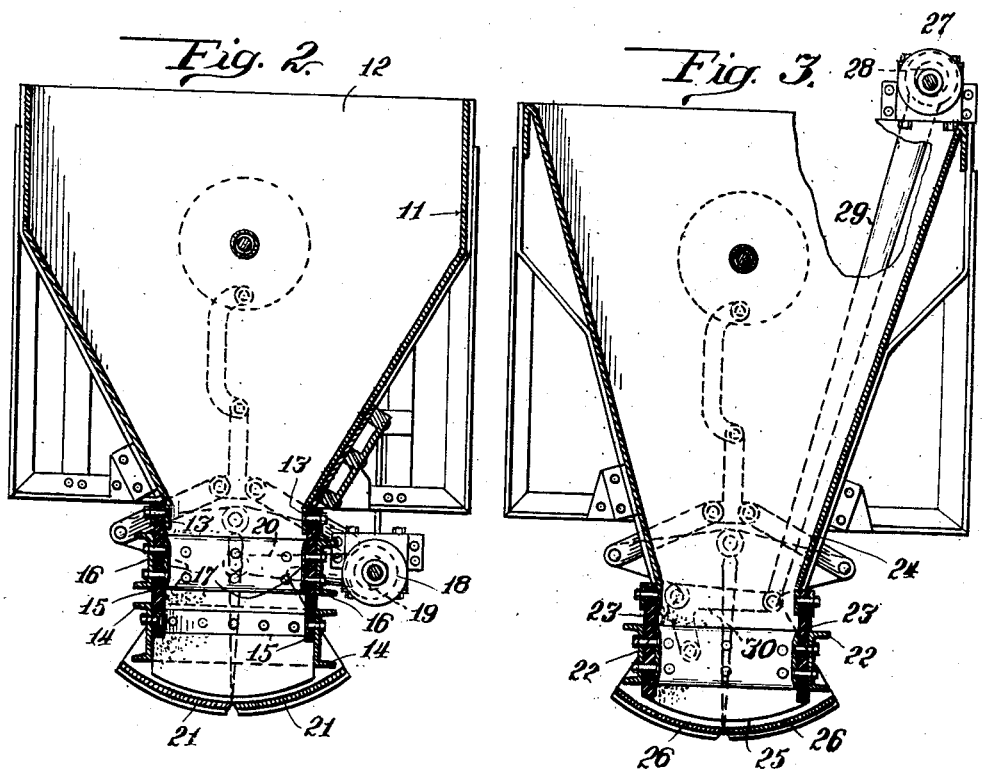
Inventor
Alfred W. French
By Rudolph J. M. Lotz
Attorney.

Patented Oct. 25, 1938

2,134,361

UNITED STATES PATENT OFFICE 2,134,361

METHOD OF PRODUCING PLASTIC CONCRETE

Alfred W. French, Chicago, Ill.

Application October 7, 1935, Serial No. 43,982

17 Claims. (Cl. 259—72)

In the Portland cement construction art it has been the aim of persons skilled in the art to produce workable plastic concrete containing no more of the water-cement ratio of the mix than is requisite and necessary to produce a finished product possessing maximum strength and density. The amount of cement, per se, employed in the mix should be no more than sufficient to cover completely all of the surfaces of the non-cementitious aggregates of the same and the amount of water employed should be no more than that which is requisite to hydrate and combine chemically with the cement. The cement, water, sand and other fine and dust particles of the mix constitute the mortar which should be just sufficient to fill the spaces between the non-cementitious aggregates when the latter are closely and compactly huddled and congregated in order to produce a product free of voids and of a density sufficient to render the same practically waterproof.

The voids occurring in concrete result from the trapping of air in the mass during the mixing of the component materials and also result from evaporation of excess water during and following the setting and curing period.

The proportions of cement and water generally employed in present day practices is far in excess of the minimum requirements in order that the mix as discharged from the mixing drum of the modern machine may be in a fluent or substantially fluent and workable state, with the result that much of the excess water and cement are discharged from the mass during settling of the latter and, later, further water is evaporated from the mass thus forming voids therein aside from those resulting from air pockets in the mass.

Climatic conditions necessarily require sometimes that the normal water content requisite to chemical combination with the cement shall be more than sufficient to effect production of the best results, as for example, in instances where the concrete is exposed to temperature higher than 70 degrees Fahr. and the air is lacking humidity to neutralize, to an appreciable extent, the higher temperature. An ideal condition, therefore, as to water-cement ratio is almost impossible of attainment, but in modern practice this ideal condition is not even closely approached because of certain obstacles to the attainment thereof which appear to have escaped observation or have presented a problem that has been recognized to some extent and has led to attempts at solution. The latter have resulted in effecting appreciable improvement in the finished product without, however, having effected noteworthy cost economies in production.

The object of the present invention, therefore, is to provide, primarily, a method of treating concrete mixes in such a manner as will permit and even require a material reduction of the water-cement ratio thereof and which will produce a finished product as nearly free of voids referred to hereinabove as climatic and other conditions governing the water-cement ratio will permit.

Present day practice consists in first introducing into the mixing drum of a modern concrete mixing machine, the prescribed proportions of coarse and fine non-cementitious aggregates together with a given water-cement ratio, these several component ingredients being then subjected to the action of the mixer for a specified time interval.

The mixture is then discharged from the mixing drum, generally, into a conveyor bucket or other conveying means which carries the mixture to the place of deposit as, for example, upon the prepared grade of a pavement strip or into so-called "forms" defining foundations of buildings, walls, columns, etc.

In the pavement construction art, the greatest advances in subsequent treatment of the deposited mix to compact the same, eliminate voids, etc. have been made as is evidenced by the large number of so-called pavement finishing machines that are employed and to which, recently, there have been added means for vibrating the reciprocating screeds, the latter being supplemented in many instances by tamping mechanisms. In the building construction art, including dams, retaining walls, etc., tamping and vibration of the deposited mix have effected appreciable improvement without, however, having accomplished any appreciable labor cost economy or any material saving in cement. The finished products resulting from the further manipulation or mechanical treatment of the mix after deposit thereof and, in some instances, prior to deposit thereof, are better, but far from perfect and much of this imperfection is due to the fact that all subsequent treatments of the concrete are adaptable only to a workable mix delivered from the mixing machine.

The present invention contemplates and has for its object to convert what may be termed an "un-workable" mix delivered from the mixing drum, due to a very material reduction in the water-cement ratio thereof, into not only a workable mix, but one which is entirely free of voids such as air-pockets, when delivered upon the surface of deposit, and has been rendered so compact and with its component aggregates so uniformly distributed throughout the mass, as to produce a finished product of far greater strength, durability and water tightness than has been produced commercially heretofore. A further object of the invention consists in producing these results at less and, at least, no greater labor cost than is involved in present general practice in the art.

Another object of the invention is to deliver the finished plastic concrete upon the surface intended to receive the same, including the bottoms bordered by construction forms, in such a manner wherever practicable as to prevent any change in conditions pertaining to the material as prepared by the method of its treatment, as for example, affording opportunity of trapping air in the mix during such deposit.

The several objects of the invention as set forth above are accomplished in the following manner, the several steps of the present method being dictated by observation of the conditions incident to the mix as delivered from the mixing plant.

The component aggregates intended to produce a plastic or workable mass of concrete are introduced into the mixing drum of a suitable machine where they undergo tumbling and other agitation and whereby the coarser and finer aggregates become distributed more or less uniformly throughout the mass. It is presumed, generally, that during the mixing process every particle of non-cementitious material will become coated with the cement included in the mass in its eventually moist state produced by the addition of water at a certain point in the mixing operation. The duration of the mixing period is ordinarily about one minute per batch and it has also been assumed that in this short space of time, the water content of the mix is broken down to a condition wherein it becomes absorbed by the cement and other components of the mixture.

The non-cementitious materials are usually required to contain no more than a specified percent of moisture and, generally speaking, the small moisture content permitted leaves said aggregate in a practically "bone dry" state or a relatively close approach thereto. During the mixing process in its first stages, the flour-like cement is distributed over the surface of the other relatively dry ingredients which normally contain a certain amount of superficial dry dust.

It is well known that dust resists penetration of water and consequently, when water is added to this dry mix, the result is that the water breaks up into tiny globules which are distributed superficially over the surfaces of the solid aggregates, but are not absorbed thereby sufficiently to produce a true mortar in the mass. These globules are microscopic and are clearly visible under a miscoscope. Before they can be properly absorbed by the cement to the extent required to hydrate the latter and combine chemically therewith to form the bonding paste or mortar of the ultimate product, the said tiny globules must be broken down to a very much greater degree than they are broken down during the mixing period.

Accordingly, unless the mix contains such an excess of water and cement as will form a fluent mud distributed through the non-cementitious coarser aggregates, the product delivered from the mixer will not be in what is commonly termed a "workable" or "plastic" mass, but will present a mass that is somewhat similar to moist beach sand disposed at some distance from the water's edge and above the water level of the body of the water which it borders. That is to say, it will break up very easily into lumps.

Where the water-cement ratio of the mix is reduced to a point of little or no excess of water and cement, respectively, over the amounts necessary to produce what may be termed a perfect mortar content, the mix will be discharged from the mixing plant in a dry state known as a "dry mix" which is unworkable by present methods of subsequent treatment.

It is because of this non-workable condition of what is known as a "dry mix", which contains a smaller and far more efficient water-cement ratio, that the so-called "wet mix" has had to be resorted to in order that the mix as delivered from the mixing plant shall be in a workable condition instead of the non-workable condition pertaining to a dry mix, as aforesaid.

The method of this invention consists essentially in mixing the component aggregates of concrete so as to include therein an appreciably smaller water-cement ratio than has been practical in the art, so as to produce in the mixer a non-workable mass and discharging the same from the mixer into a receptacle. The receptacle is, preferably, one provided with means for discharging the concrete in plastic condition from the bottom thereof and the next step in the method, following delivery of the unworkable mass into the receptacle, consists in subjecting the mass, while confined in said receptacle, to a violent shaking by imparting to the receptacle, or as hereinafter pointed out, to a portion thereof, a violent and rapid back and forth or reciprocatory motion such as will cause the component aggregates of the mixture to be projected against each other and against the opposed front and rear walls of the reciprocable member in which said mass is confined to produce impacts of the coarser aggregates against the finer component aggregates and also to produce in the mixture a grinding and wedging action, the wedging resulting from forcible huddling of coarse aggregates into closely interfitting relations.

The impacts produced in the mass by the shaking cooperates with the grinding and wedging actions to break down the tiny water globules superficially disposed upon surfaces of said aggregates so as to practically atomize said water globules to a point where they are no longer visible under a powerful microscope. This shaking of the mass thus brings about a rapid absorption of water by the cement in the quantity required to hydrate the cement and produce the chemical reaction which produces the bonding paste or plastic mortar of the mixture.

Naturally, this violent shaking of the mass also causes a very rapid settling thereof by gravity into a compact condition wherein the component solids become distributed in a closely huddled or congregated condition with their opposing faces, which are rough and irregular, separated from each other by a relatively thin, but sufficient, film of mortar which consists of the cement, water, dust, sand and other fine particles of the mixture.

The compaction of the mixture and the breaking up of the water globules also effects complete elimination from the mass of air trapped therein during the mixing process and which may have been absorbed by the water prior to its introduction into the mixing drum or during the mixing period.

Thus, the dry, unworkable mix is converted into a plastic and readily workable mass, free of voids, but which may, for reasons above pointed out, contain the requisite excess of water to compensate for atmospheric conditions affecting the concrete after deposit thereof where it is to set and during the setting and curing period.

Generally speaking, the water-cement ratio of the mix will be slightly in excess of the minimum requirements in order that the top surface of the concrete mix, when deposited where it is to set after treatment, as aforesaid by shaking, shall be covered with a thin film of cement to form a bond with the next succeeding layer of the plastic concrete delivered upon the preceding batch or, as in the case of highway pavements, to provide a workable surface for the action of the finishing devices employed for imparting a smooth surface to the pavement.

The duration of the shaking of the concrete mixture, as above stated, is as brief as is sufficient to accomplish the desired result. In practice, I have found that by imparting to the mass in the receptacle by means of movement of the receptacle or a part thereof, a sharp reciprocating stroke approximating thirty back and forth movements per second in any predetermined direction, that the result of conversion of nonworkable into a workable plastic mass will be accomplished in a small fraction of a minute.

The present day commercial practice of mixing concrete in large batches, weighing usually several tons each, makes it impractical and uneconomical to subject all of the whole batch at once, as delivered into a receptacle, to the intensive shaking above referred to. Hence, the method of this invention contemplates a progressive, intensive shaking of the mass, preferably from its lowermost end portion to its uppermost end portion, and applying the said shaking action substantially horizontally. This progressive shaking of the mass at or near the bottom thereof is most advantageous from the standpoint of economy of power consumption and also for the reason that the portion of the mass that is most directly affected by the intensive shaking, communicates movement to the remaining portion of the mass to cause a settling of the latter and, therefore, subjects the lower portion of the said mass to column pressure of the higher portions during the shaking period. This column pressure acts very similarly to a hydrostatic head to promote compaction of the whole mass and co-acts with the shaking of the lower portion thereof, to effect liberation and discharge of all gaseous content of the mixture. It also causes that portion of the mass subjected to violent shaking to be crowded densely against the confining walls surrounding it.

The progressive shaking of the mass, as aforesaid, is accomplished most advantageously by providing a suitable shaking mechanism adjacent the discharge end of the receptacle and operating the same throughout the entire period of flow of the mass from said receptacle. The rapidity of flow of material will be determined easily by a lateral movement of the receptacle over the surface or area intended to receive the plastic concrete, it being desirable, however, to the attainment of best results, that at the instant of first discharge of the plastic concrete from the receptacle, the discharge end of the latter be disposed directly upon the surface upon which the discharge of concrete is to be made, and, thereafter, gradually raising the receptacle to a predetermined height while flow of concrete therefrom continues and then, while maintaining said receptacle at a predetermined elevation, moving the same gradually laterally from the point of first discharge over as much of the area selected for deposit as the batch of concrete may cover to the selected depth.

Obviously, as in the case of concrete highway construction, the receptacle receiving the concrete from the mixing plant may comprise a hopper into which the material is delivered at sufficiently frequent intervals to maintain the same filled to an average level and operating the shaking mechanism continuously during continuous travel of the hopper over the pavement strip (intended to receive the finished product) at a speed commensurate with the rapidity of feed of the hopper from the mixing plant or plants employed.

In highway construction practice, one or several concrete mixers are disposed for travel in advance of a machine constructed to carry out the method of this invention, as above described, and the said mixing machines will travel substantially coincidentally with the speed of travel of the machine so as to maintain an average predetermined level of mix in the said hopper of said machine.

In the accompanying drawing, I have illustrated, more or less diagrammatically, apparatus adapted for carrying out the method of this invention to the best advantage.

In said drawing,

Figure 1 is a vertical, longitudinal, diagrammatic, sectional view of a machine adapted for carrying out the method of this invention as applied to highway pavement construction.

Fig. 2 is a similar diagrammatic, vertical, sectional view of a bucket equipped with means for carrying out the method of this invention and which is adapted to be used for transporting the mix from a mixing plant to a distant point of deposit.

Fig. 3 is a view similar to Fig. 2 illustrating a type of bucket used to carry out the method of this invention and adapted, more particularly, for use in connection with narrow forms defining foundation walls of buildings or similar structures.

The structure illustrated in Fig. 1 constitutes a substantial reproduction, in part, of the machine illustrated and described in my co-pending application for Letters Patent, Serial No. 20,426, reference to which is had for a complete disclosure of a machine arranged to travel on the side forms bordering a pavement strip for laying plastic concrete prepared by the method of this invention progressively along said strip to the requisite height and crown.

The said machine includes the hopper 1 shown in Fig. 1 of the accompanying drawing which is suitably mounted upon a vehicle frame carrying an engine for propelling the latter and for actuating the shaking mechanism, said engine and vehicle frame being omitted from illustration.

The rigid portion 2 of the discharge spout of the hopper 1 terminates at an appreciable elevation above the level of the side-forms bordering the pavement strip except at the sides of the said hopper, the side walls of the latter extending downwardly to substantially the level of the crowns of the side forms and having their inner faces disposed substantially flush with the inner faces of said side forms.

Secured along their upper edge portions to the lower edge portions of the front and rear walls 2 of the hopper spout, are strips 3 and 4 of rubber belting or other suitable flexible material. The lower edge portion of the rear strip 3 is secured to the upper edge portion of the front wall of a screed 5 which spans the pavement strip and is supported at its ends upon the side forms thereof.

The front strip 4 is secured along its lower edge to the upper edge portion of the channel bar 6 which also spans the pavement strip in the manner of the screed 5. The upper edges of said channel bar and said screed are spaced from the lower edges of the front and rear walls 2 of the hopper spout and the channel bar 6 is rigidly connected at its ends with the ends of the screed 5 by connecting members 7.

The shaft 8, which is equipped at opposite ends with eccentrics 9 having a short throw, such, for example, as one-eighth of an inch, more or less, is geared to the engine for rotation at high speed, as for example, 1000 to 2500 R. P. M. the eccentrics 9 are connected with the screed 5 by means of connecting rods 10.

The said machine is adapted to travel behind one or several concrete mixing machines, such, for example, as the boom and bucket types operable to deliver batches of concrete mix into the hopper 1 and distribute the material more or less uniformly therein to a fairly uniform level.

The machine may travel at a speed of from five to ten feet per minute and during its travel, the concrete contained in the hopper 1 and discharge spout thereof, of which the belt strips 3 and 4 and the screed 5 and channel bar 6 form parts, will be supported upon previously progressively discharged concrete and the said elements 5 and 6 will be reciprocated rapidly and at high speed. Assuming that the shaft 8 is rotated at 1800 R. P. M., the concrete mix in the lower end portion of the discharge spout will obviously be subjected to violent movement which is referred to herein as "shaking" and which may also be defined as "jolting", imparting successive shocks, impacts or blows to the portion of the mass confined within and adjacent to the zone of reciprocation defined by the screed 5 and channel bar 6 This movement of said last-named mass causes the breaking down of water globules and the grinding and wedging actions described hereinabove to effect also the close huddling or congregation of coarser aggregates, elimination of gaseous content and distribution of mortar content as described above.

This shaking of the lower end portion of the hopper content necessarily causes settling of the higher portions and keeps the same in constant motion so that it exerts column pressure similar to hydrostatic head upon the positively shaken portion of the mass to add said pressure as a force aiding the compaction and other results achieved by the intensive shaking aforesaid.

Assuming the concrete slab to be disposed upon the pavement strip to be eight inches deep and the speed of travel of the machine to be ten feet per minute (120 inches), then there would be delivered from the discharge spout of the hopper, two inches per second of prepared concrete. If the height of the screed 5 and channel bar 6 be assumed to be ten inches and the width of space separating the same to be twelve inches, it will be apparent that every portion of the hopper content will be subjected progressively to a very large number of impacts, blows, shocks, or intensive shaking action between the instant of entrance into the zone of such direct action and discharge upon the pavement strip, such discharge being effected by gravity only.

As and when delivered upon the pavement strip the concrete has been converted into a plastic but very compact mass, which, during passage of the discharge end of the hopper over the same is still being subject to pressure and to a force, which may be termed vibration, or its substantial equivalent and its compactness is thus at least maintained. The screed 5 serves the usual purpose of the screeds of other pavement finishing machines to impart a smooth surface to the pavement slab, but by reason of its very rapid reciprocation and short stroke longitudinally of the pavement strip, the screed 5 acts more or less to force into place pieces of coarse aggregate that project above the predetermined contour and level of the slab.

The combined action of the intensive shaking and column head pressure exerted upon the concrete being discharged causes the latter to surge upwardly ahead of the channel bar 6 to a slightly higher level than that of the surface of the finished slab, but this deposited concrete does not break up because of its plasticity and because it surges ahead under the influence of the column pressure aforesaid, and therefore does not trap air into the advancing deposited mass.

In Figs. 2 and 3, there are illustrated, more or less diagrammatically, buckets for transporting concrete mixes from the mixing plant to the place of ultimate deposit of the concrete as into forms defining building foundations, walls and other structures, each of said buckets being equipped with mechanism similar to that of Fig. 1 for carrying out the method of this invention.

In the structure of Fig. 2, the hopper or body portion 11 of the bucket is equipped with end walls 12 extended to project below the level of the lower edges 13 of the side walls thereof. The lower edges of the end walls 12 are arcuate and the side edge portions thereof are connected with each other by the channel bars 14 which are spaced widely from the lower edges 13 of the side walls.

Strips 15 of rubber belting or other suitable flexible material are secured along their upper and lower edge portions, respectively, to the lower edge portions 13 of the side walls and upper edge portions of the angle bars 14. Channel bars 16 and plates 17 are secured to the respective strips 15 over the entire lengths of the latter and are suitably connected with each other, the arrangement and construction being such that said channel bars may be reciprocated in unison.

An electric motor 18 is mounted upon the body of the bucket at one side of the discharge spout thereof and the shaft of said motor is equipped with eccentrics 19, similar to the eccentrics 9 of the shaft 8 of Fig. 1, and these are connected by means of connecting rods 20 with one of the channel bars 16 so that the latter will be reciprocated at high speed.

The bucket is also equipped with the arcuate gates 21 and manually operable mechanism for opening and closing said gates which may be of any suitable and well known type as illustrated in dotted lines in Fig. 2, particular description of said mechanism being omitted as unnecessary herein.

In the case of the bucket illustrated in Fig. 3, a rectangular frame composed of channel bars 22, is suspended by means of a rectangular frame 23 composed of rubber belting or the like, from the lower end of the discharge spout 24, the end walls of the flexible suspension frame being extended downwardly and provided with arcuate edges 25 for cooperation with the arcuate manually operable gates 26 controlling the discharge end of the bucket, similarly to the gates 21 of Fig. 2.

The structure of Fig. 3 is equipped with a relatively long discharge spout which may be square or approximately square in cross-section and of cross-sectional dimensions which will permit said discharge spout to project to the bottom of an enclosure bordered by foundation or wall forms.

In the structure of Fig. 3, the electric motor 27 for reciprocating the channel bar frame 22 is mounted at one side of the top of the body of the bucket and the eccentrics 28 on the shaft of said motor are connected by means of rods 29 with the bell-crank levers 30 suitably pivotally mounted at their elbow portions upon the lower end portions of the end walls of the discharge spout 24 and which are also operatively connected with the channel bar frame 22 to reciprocate the latter.

The buckets of Figs. 2 and 3, respectively, are operated, preferably, as follows:

The gates thereof being closed, said buckets receive a bath of concrete mix from the mixing plant and convey it to the place of ultimate deposit over cable-ways or by means of cranes or derricks, all of which must be equipped with means for raising and lowering the buckets as required.

As soon as the buckets reach the place of ultimate deposit, the operator connects the motors thereof with a source of current to cause reciprocation of the respective mechanisms described hereinabove. This is done prior to the ultimate manipulation of the bucket carrying means to bring it unto desired position above the area intended to receive the contents and while the bucket is being lowered until its gates are disposed substantially in contact with the surface upon which first discharge is effected.

These manipulations are effected relatively rapidly as in from thirty to sixty seconds and by that time the lower portion of the mass of concrete will be ready for deposit. Hence, the operator opens the gates of the bucket to the desired extent to start discharge therefrom and then the bucket is raised gradually to a predetermined level above the last-named surface and is thereafter moved laterally over so much of the selected area of deposit as the contents of the bucket will cover to the desired height.

The progressive discharge of contents of the bucket causes a gradual decrease in the height of the column head above the zone of reciprocatory action on the mass, but because of the constantly increasing severity of action on said column head, the last portion of the concrete delivered from the bucket is in the same condition as other portions except that it carries a larger proportion of surplus mortar.

But during deposit of the concrete, and as stated in connection with operation of the structure of Fig. 1, the portion of the deposited concrete immediately below and adjacent the discharge orifice of the bucket is subjected to the full equivalent of vibration which, as has been demonstrated in this art, tends to bring mortar to the surface and this has been found to occur to an extent sufficient to insure bonding together of the successive layers of concrete.

Obviously, the mode of operation of the buckets of Figs. 2 and 3 will be changed and varied to fit the conditions pertaining to the type of structure as, for example, the presence of interfering reinforcing rods, wire structures, etc.

From the foregoing description, it will be obvious that the present method, carried out in the preferred manner illustrated in the several structures of Figs. 1, 2 and 3 differs from previous practice, so far as known to me, primarily in subjecting the mix to an absolutely positive and violent movement alternately in different directions and that this, in and of itself, produces the desired result independently of other contributory forces or manipulations.

By effecting the violent shaking of the mass horizontally, the advantage of the added force of gravity is obtained which acts more particularly to speed up the treatment of the concrete in that it contributes to acquisition of desired density and decreases the otherwise requisite number of impacts that otherwise would or might be required to attain the best results in the finished products.

A third factor that lends an appreciable advantage to the whole method including treatment and deposit of the mix, lies in effecting deposit in such a manner as is best adapted to prevent formation of air pockets in the mass after or as it leaves the hopper or bucket as by dropping the same from the bucket through an air space intervening between it and the surface of deposit.

The present method, if carried out by means of the structures of the respective Figs. 1, 2 or 3, and more particularly in the manner described in connection with Fig. 1, involves the subjection of the mix, disposed within the zone of reciprocation, simultaneously to forces acting in three different directions, and each of which is of a positive dynamic nature.

In the treatment of concrete mixes by vibrators disposed within a deposited mass or acting upon the surface of such a mass, as in the paving art, or resort to tamping as generally practiced, the forces applied act in only one direction and with diminishing force as the distance of portions of the mass from the point or zone of such application increases. More explicitly stated, the methods heretofore and now employed do not effect a back and forth movement of all of the components of the mix with equal force on every particle and, more particularly, they fail to effect movement of the intensive and violent nature as the present method comprehends.

In the subjection of concrete mix to vibration by the means commonly used for that purpose, whether applied to the surface of a deposited mass, to a receptacle containing such a mass, or by immersion of vibrators in a confined mass, the latter is subjected to tremors which radiate or penetrate the mass and are of decreasing force as the distance from the point or zone of application of the vibrator increases. The mass is caused to tremble, more or less, and this trembling cooperates with gravity to facilitate settling of the mass. The latter helps to effect some of the elimination of gases and excess water, a closer huddling of the affected areas of coarser aggregates and more uniform distribution of the mortar content. However, this is dependent on the provision that the vibration of sufficient force is continued for a relatively long time interval.

But, vibration of the mass does not subject it to severe high frequency shocks applied such cessively in different directions with equal force throughout the whole portion of the mass disposed within the zone of application of these shocks and which produce the violent projection of component solids against each other first in one direction and then in another to speed the work that a sufficient period and violence of vibration might produce, as is in keeping with applicant's invention.

In carrying out the present method in the preferred manner described in connection with Figs. 1, 2 and 3 of the drawing, the violent high frequency bodily displacement or reciprocation of a portion of the mass sets up tremors in the balance of the latter so that the material is subjected first to the trembling of gradually increasing violence as it approaches the zone of reciprocation or shaking and is finally subjected to that very violent action.

It will be apparent to those skilled in the art that the method of this invention necessarily effects a great saving of time and, because of the violence and high frequency of the shaking as distinguished from trembling of the mass, and produces a better result than is produced by trembling alone.

Furthermore, the present method permits of the production of plastic concrete of the "no-slump" type or of any degree of slump that may be specified for a particular job.

Exhaustive tests of finished product produced by the present method have demonstrated that its component aggregates are distributed more perfectly and in more closely huddled or congregated relation than is true in the case of wet mixes treated in accordance with the customary practices, that it is more dense and weighs appreciably more per cubic foot, and by reason of its greater density, is far more impervious to moisture than said ordinary product, and is much stronger.

A further advantage of the greater density of the product of this invention lies in the fact that a pavement strip composed of the same can be opened to traffic in from ten to fourteen days as opposed to the usual thirty day delay specified by highway engineering department of the several States.

It is understood that while I prefer to carry out the method of this invention in the manner described in connection with descriptions of the structures and operation of Figs. 1, 2 and 3, said method is not limited to correspond to said operations. It is believed that the same is novel to the extent of effecting a violent shaking of the entire receptacle containing a concrete mix as, for example, violently shaking molds for the production of fence and other posts, columns, building blocks and the like, in many of which reinforcing means are included.

The method as described in connection with Figs. 1, 2 and 3 is directed to accommodate the same most effectively to the present day substantially continuous construction operations on large scales as in pavements, dam, large building construction, retaining walls, bridge construction and the like, with a view to speeding up rather than slowing down such operations.

Obviously, the buckets of Figs. 2 and 3 could be operated similarly to the hopper of Fig. 1 by feeding the same from ordinary conveyor buckets or other means with sufficient frequency to maintain the same filled to a level well above the zone of reciprocation at the lower end of the discharge spout.

The reciprocable portions of the hopper and buckets, respectively, may be regarded as receptacles, per se, which receive the mix progressively from the upper or body portions of the hopper and buckets, or said reciprocable portion may be termed a chute through which the mix passes progressively and wherein it is converted into a plastic workable concrete. In either event the mix is confined and is subjected bodily to the violent shaking while so confined in the shaker element.

A very important feature of the method resides in the fact that while the aggregates of the mix are displaced from their relative positions in the relatively loose, spongy mass delivered from the mixing plant, such displacement does not cause any stratification of aggregates of different sizes, but maintains a uniform distribution of the coarser aggregates through the whole mass and a distribution of the mortar content into thin, irregular films filling the spaces between the closely huddled coarser aggregates.

By effecting gravity deposit of the plastic mass, these distributions of aggregates are not disturbed, changed or varied.

The method is advantageous also in that the product thereof is controllable easily as to degree of slump and settling, it being preferable, generally that the concrete shall not settle appreciably during the setting and curing period.

I claim as my invention:

1. The hereindescribed method of treating and laying concrete mix progressively which consists in disposing the concrete in a confined mass of appreciable height and supporting the bottom of said mass upon a portion of a surface upon which all of said mass is to be deposited progressively, then severely shaking the lower end portion of the mass in a direction laterally of its direction of progressive flow upon the said surface and continuously during said flow with a force sufficient to displace said portion alternately in opposite directions from its initial position in the mass and controlling the rapidity of said flow to cause all parts of the mass to be subjected to said shaking to a substantially equal degree progressively during its said flow.

2. The hereindescribed method of treating and laying concrete mix which consists in disposing the same in a receptacle of appreciable height and from the bottom of which the same is to be discharged for deposit upon the surface intended to receive it, which consists in controlling its progressive discharge from said receptacle and subjecting the lower end portion of the mass to severe shaking in a direction laterally of the direction of its flow from said receptacle and during said flow period with a force sufficient to displace said portion alternately in opposite directions from its initial position in the mass, whereby the entire mass is subjected progressively to said shaking.

3. The hereindescribed method of treating concrete mix which consists in effecting controlled progressive flow by gravity of a mass of said mix in a closely confined state through a rapidly reciprocating chute to effect severe shaking bodily of the successive portions of the mix disposed within the zone of influence of said chute in a direction laterally of the direction of the flow of said mix and maintaining an average level of the mix continuously above the zone of influence of said chute for subjecting the portion of the mass within said zone of influence to the column pressure of the higher portion of said mass.

4. The hereindescribed method of treating concrete mix which consists in effecting controlled progressive flow by gravity of a mass of said mix in a closely confined state through a rapidly reciprocating chute to effect severe shaking bodily of the successive portions of the mix disposed within the zone of influence of said chute in a direction laterally of the direction of the flow of said mix and maintaining an average level of the mix continuously above the zone of influence of said chute for subjecting the portion of the mass within said zone of influence to the column pressure of the higher portion of said mass and preventing separation of any portion of the mass from any other portion thereof following passage through said chute.

5. The method of improving a plastic concrete mix, which comprises feeding an original mix by force of gravity towards the intended zone of application, and violently and successively displacing said mix bodily in directions opposed to the force of gravity as the mix arrives near said zone of application and while the weight of the on-coming mix bears upon the advanced portion of the mix that is being displaced therebeneath.

6. The method of improving a plastic concrete mix, which comprises feeding an original mix by force of gravity towards the intended zone of application, and violently and successively displacing said mix bodily in directions opposed to the force of gravity as the mix arrived near said zone of application and while the weight of the on-coming mix bears upon the advanced portion of the mix that is being displaced therebeneath and discharging the mix at said intended zone of application from a point immediately adjoining the portion of the mix that is being displaced so that an upward pressure opposed to the weight thereover will be exerted on the said mix that is being displaced.

7. The method of improving a plastic concrete mix, which comprises laterally confining an original mix in an area from which it is to be discharged, and as the mix nears the point of delivery from said confining means vigorously shaking the same en masse to cause the constituents of the mix to be bodily displaced first in one lateral direction and then in another lateral direction to create combat, rearrangement and condensing of the constituent elements of the mix substantially uniformly throughout the mix, and applying pressure in the line of feed of the mix on the mass being shaken to break down and eliminate air and unnecessary water.

8. The method of improving a plastic concrete mix, which comprises laterally confining an original mix in an area from which it is to be discharged, and as the mix nears the point of delivery from said confining means vigorously shaking the same en masse to cause the constituents of the mix to be bodily displaced first in one lateral direction and then in another lateral direction to create combat, rearrangement and condensing of the constituent elements of the mix substantially uniformly throughout the mix, applying pressure in the line of feed of the mix on the mass being shaken to break down and eliminate air and unnecessary water, and then delivering the mix to the intended point of application without exposing the interior of the mass to air.

9. The method of improving a plastic concrete mix, which comprises laterally confining an original mix in substantially columnar form to feed by force of gravity and utilize the weight of super-imposed portions of the mix on other portions of the mix therebelow, and successively violently displacing said mix bodily in varying directions substantially transversely of the force of gravity so that the portion of the mix being bodily displaced will in part cross the portion of the mix thereabove and coact therewith substantially throughout abutting portions of the mix in rearranging, settling and condensing the constituent elements of the portion of the mix being displaced.

10. The method of improving a plastic concrete mix, which comprises laterally confining an original mix in substantially columnar form to feed by force of gravity and utilize the weight of super-imposed portions of the mix on other portions of the mix therebelow, and successively violently displacing said mix bodily in varying directions substantially transversely of the force of gravity so that the portion of the mix being bodily displaced will in part cross the portion of the mix thereabove and coact therewith substantially throughout abutting portions of the mix in rearranging, settling and condensing the constituent elements of the portion of the mix being displaced, and utilizing the shock of the displacements of the lower portion of the mix to create a vibration throughout substantially the entire portion of the mix immediately thereabove to preliminarily treat and prepare the original mix for the displacements and final condensing operation 11. The method of converting an unworkable concrete mix into a plastic workable mass which consists in disposing the mix for support upon a surface and to a height appreciably above said surface, maintaining an average height of said mass and effecting lateral displacements of a portion of the mass disposed between the base and crown portions thereof with a rapidity and force sufficient to effect conversion of the mortar forming constituents of the mass into plastic fluent mortar and effecting substantially uniform distribution of the said mortar through the portion of the mass disposed within the zone of influence of said lateral displacements.

12. The hereindescribed method of converting an unworkable, crumbly concrete mix into a plastic workable mass which consists in passing the mass progressively through a receptacle and during its passage and along a predetermined length of its travel subjecting successive portions of the mass to movement laterally of the direction of its passage relatively to the remainder of said mass in successively different directions with a force and rapidity sufficient to convert the mortar forming constituents of the mass into plastic, fluent mortar paste and effecting also distribution of said paste substantially uniformly through the portion of the mass subjected to said lateral movements, and controlling the rapidity of passage of said mass through said receptacle for controlling the period of time of subjection of successive portions of the mass to said movements.

13. The hereindescribed method of converting an unworkable, crumbly concrete mix into a plastic workable mass which consists in passing the mass progressively through a receptacle and during its passage and along a predetermined length of its travel subjecting successive portions of the mass to movement laterally of the direction of its passage relatively to the remainder of said mass in successively different directions with a force and rapidity sufficient to convert the mortar forming constituents of the mass into plastic fluent mortar paste and effecting also distribution of said paste substantially uniformly through the portion of the mass subjected to said lateral movements, maintaining a pressure upon said last-named portion of the mass in a direction tending to expedite its passage through the receptacle, and resisting said passage counter to said pressure for controlling the period of time of subjection of successive portions of the mass to said movements.

14. The method of converting unworkable concrete mix into plastic workable concrete, which consists in successively and progressively subjecting portions of a mass of mix to sharp shocks imparted in rapid succession in successively different directions with a force sufficient to effect displacements in mass of said portions relatively to the remainder of the mass without separating the same from the latter, and continuing the said treatment until the mortar-forming constituents of said successive portions have been converted into plastic, fluent mortar paste.

15. The method of converting unworkable concrete mix into plastic, workable concrete, which consists in subjecting appreciable portions of a mass of mix successively and progressively to shocks applied thereto alternately in opposite directions with rapidity and force sufficient to effect displacements in mass of said portions relatively to the remainder of the mass without separating the same from the latter, continuing said treatment until the mortar-forming constituents of said successive portions have been converted into plastic, fluent mortar paste, maintaining the whole mass in motion in a direction laterally of the direction of the shocks applied thereto, and applying said shocks to the advance portion of the moving mass.

16. The method of converting unworkable concrete mix into plastic, workable concrete, which consists in subjecting appreciable portions of a mass of mix successively and progressively to shocks applied thereto alternately in opposite directions with rapidity and force sufficient to effect displacements in mass of said portions relatively to the remainder of the mass without separating the same from the latter, continuing said treatment until the mortar-forming constituents of said successive portions have been converted into plastic, fluent mortar paste, maintaining the whole in motion by gravity toward a surface of deposit therefor, and effecting said displacements of the portions of the mass nearest adjacent the said surface.

17. The method of converting unworkable concrete mix into plastic workable concrete, which consists in maintaining a mass of said mix confined against separation of any part of same from the remainder thereof and while said mix is so confined, effecting displacements of portions thereof in successively different directions relatively to the remainder of the mass without separation from the latter and with such rapidity and force and during a sufficient time interval to effect conversion of the mortar-forming constituents of the whole mass into plastic, fluent mortar.

ALFRED W. FRENCH.